United States Patent
Cimini et al.

(10) Patent No.: US 6,827,448 B2
(45) Date of Patent: *Dec. 7, 2004

(54) MERCHANDISE DISPLAY CASE AND SYSTEM

(75) Inventors: Joseph Cimini, Dallas, TX (US); Ignaz M. Gorischek, Dallas, TX (US)

(73) Assignee: The Neiman Marcus Group, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 10/431,091

(22) Filed: May 7, 2003

(65) Prior Publication Data

US 2003/0206275 A1 Nov. 6, 2003

Related U.S. Application Data

(63) Continuation of application No. 10/103,172, filed on Mar. 20, 2002, now Pat. No. 6,607,275.

(51) Int. Cl.[7] .............................................. G03B 21/14
(52) U.S. Cl. .............................. 353/28; 353/74; 40/442
(58) Field of Search ............................. 353/28, 30, 74, 353/77; 40/447, 443, 444

(56) References Cited

U.S. PATENT DOCUMENTS

| | | |
|---|---|---|
| 3,292,287 A | 12/1966 | Marn |
| 3,707,115 A | 12/1972 | Rush |
| 4,012,133 A | 3/1977 | Burton |
| 4,462,683 A | 7/1984 | Hiraba |
| D303,739 S | 10/1989 | Egarton, Jr. |
| 5,123,192 A | 6/1992 | Hsieh |
| 5,190,286 A | 3/1993 | Watanabe et al. |
| 5,291,297 A | 3/1994 | Steinmeyer |
| D383,623 S | 9/1997 | Goodwin et al. |
| 5,669,685 A | 9/1997 | Kotani et al. |
| 5,722,747 A | 3/1998 | Baron |
| 6,481,851 B1 | 11/2002 | McNelley et al. |

*Primary Examiner*—William C. Dowling
(74) *Attorney, Agent, or Firm*—Christie, Parker & Hale, LLP

(57) ABSTRACT

A merchandise display case and system are provided, comprising a frame housing an image projector, a mirror and a rear-display panel on which the merchandise is supported and displayed, to provide a view that is a combination of the merchandise and an image emanating from below or behind the merchandise. The emanating image and the selected placement and positioning of the merchandise on the emanating image can be coordinated physically and thematically to create a unique visual experience. The system is interactive, operative in default and interactive modes and includes various video image sources which may be selected by a customer who provides user input signals to a microcontroller subsystem which controls the plurality of video image sources and other components to be responsive to the customer.

20 Claims, 4 Drawing Sheets

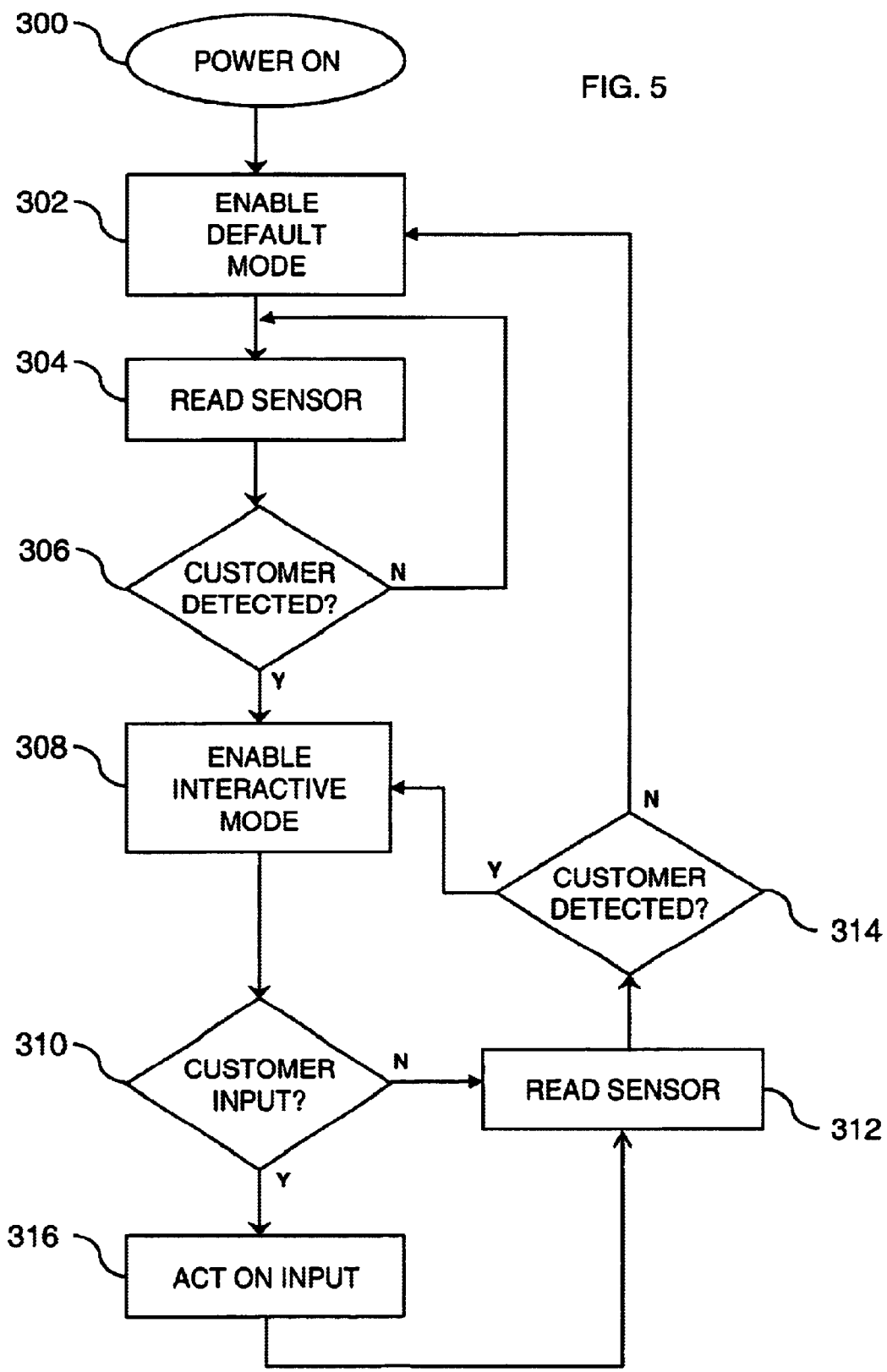

MERCHANDISE DISPLAY CASE AND SYSTEM

CROSS-REFERENCE TO RELATED APPLICATIONS

This application is a continuation of U.S. patent application Ser. No. 10/103,172, filed Mar. 20, 2002 now U.S. Pat. No. 6,607,275, the disclosure of which is incorporated herein by reference.

BACKGROUND OF THE INVENTION

Retail establishments such as department stores use many different means within their premises to promote their merchandise. In-store marketing aids may include signage and banners. High-end department stores may also use lighting, music and even live models or solicitors. While posters, pictures or images are often used in this regard, the display of actual merchandise is often preferred for certain merchandise. To that end, display cases work particularly well for those items subject to a high degree of personal preference and selection by the consumer, such as cosmetics, perfumes, and jewelry. It is therefore important that the merchandise be displayed in a manner that is attractive and eye-catching without being obstructed or obscured by the display case. The item on display should ultimately capture the attention and focus of the customer, not music or lighting which can be distracting. Thus, it can be a fine line between a display that is too subdued and ordinary versus one that is too busy and too excessive. Moreover, ideal marketing aids are those that complement and cooperate with the display case and the merchandise displayed. The display case and any other coordinating marketing aids should draw the customers' attention, but only as a stage or platform on which the merchandise is the true showpiece.

An ideal display case that meets all of the foregoing conditions should also be adaptable to changes and updating with minimum effort and labor. Since promotional campaigns change as frequently as fashion trends, a display case should be readily adaptable to be used for different merchandise and different promotional themes. Such an ideal display case should lend itself to promoting, for example, cosmetics during a holiday weekend, men's cologne the following week, and then perhaps evening shoes and purses the following weekend.

Attendant with the use of display cases within a store is the efficient use of floor space and/or wall space which is often limited. Many finer retail establishments follow strict guidelines on maintaining their premises clean and orderly. Cluttered countertops and floor space pose an eye-sore for shoppers, if not also a safety hazard for shoppers and employees alike. Thus, where display cases are used, they should occupy a relatively minimal amount of space. And, where marketing aids are used with the display case, such aids should also occupy a relatively minimal amount of space. If possible, marketing aids should be incorporated with the display case if not only for space efficiency, but for overall aesthetics of the display case, as well.

Moreover, in an age where interactive technology has become the norm, a display case should be adaptable to provide interactive capabilities or at least user options. Thus, a display case system that is responsive to customers is ultimately more modern, more reflective of the present interest and trend in technology and therefore ultimately a better vehicle for showcasing merchandise.

SUMMARY OF THE INVENTION

The present invention is directed to a merchandise display case having a rear-projection panel with a receiving surface, and an image viewing surface on which the merchandise is supported, and a projector adapted to project an image that is visible on the image viewing surface of the panel. In accordance with the invention, the display case presents a unique and intriguing visual experience as provided by a view that superimposes or otherwise incorporates the merchandise with the image emanating from the panel on which the merchandise is supported. The display case may include a mirror oriented to reflect the image from the projector onto the receiving surface of the panel and the image is preferably dynamic and thematically related to the merchandise displayed. The foregoing components of the display case may be housed in a frame configured with a drawer in which the rear-projection panel is situated. Moreover, the image may be of an intensity such that it illuminates the merchandise situated on the rear-projection panel.

The display system of the present invention comprises the aforementioned display case, at least one user input device, a plurality of one image sources adapted to provide the image to the projector and a control unit connected to the image sources, the projector and the user input device, where the control unit is configured to receive user input signals for controlling at least one of the image source to transmit signals representative of the image to the projector. In accordance with the invention, the display system presents a view combining the merchandise and an image visible on the panel which is controlled by the system in an manner that is responsive to and interactive with a user. The image sources of the system may include a VCR, a DVD player and/or a video camera configured to transmit video image signals to the image projector of the display case. The control unit can operate the system between a default mode and an interactive mode depending on whether a customer's presence is detected by a sensor. User input devices for enabling communication between a customer and the system may include a touch screen, a keypad and/or a heat-sensitive touch pad. A printer is also included to enable the customer to print information stored in the control unit and/or displayed on the rear-projection panel.

These, as well as other features of the invention, will become apparent from the detailed description which follows, considered together with the appended drawings.

BRIEF DESCRIPTION OF THE DRAWINGS

In the drawings, which constitute a part of this specification, exemplary embodiments demonstrating various features of the invention are set forth as follows:

FIG. 5 is a flow diagram illustrating the steps performed by the system of FIG. 4.

DETAILED DESCRIPTION OF THE INVENTION

Figure 1:
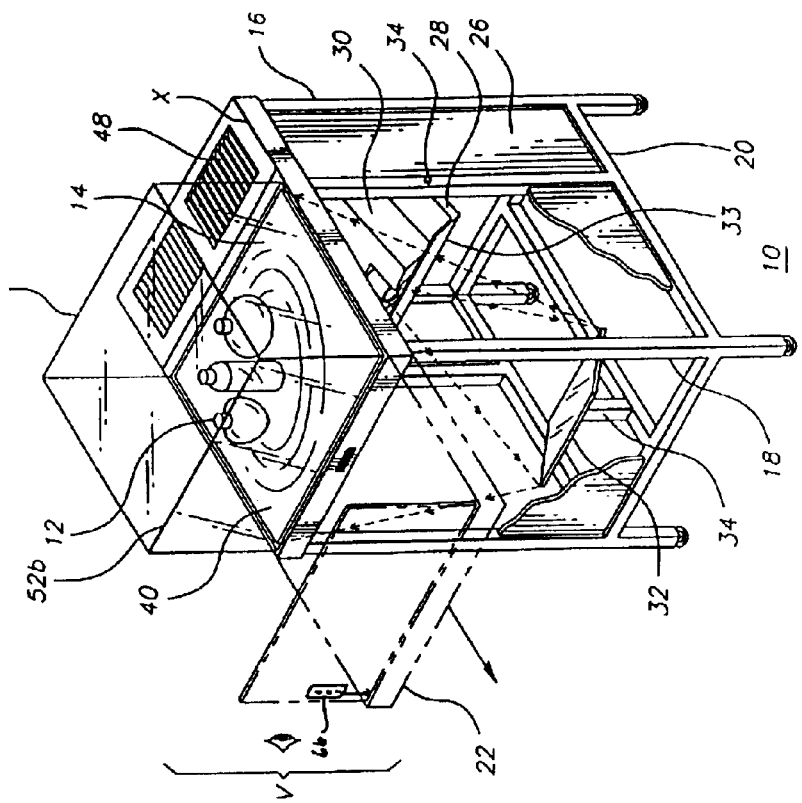
FIG. 1 is a perspective view of an embodiment of a display case of the instant invention.
Figure 2:
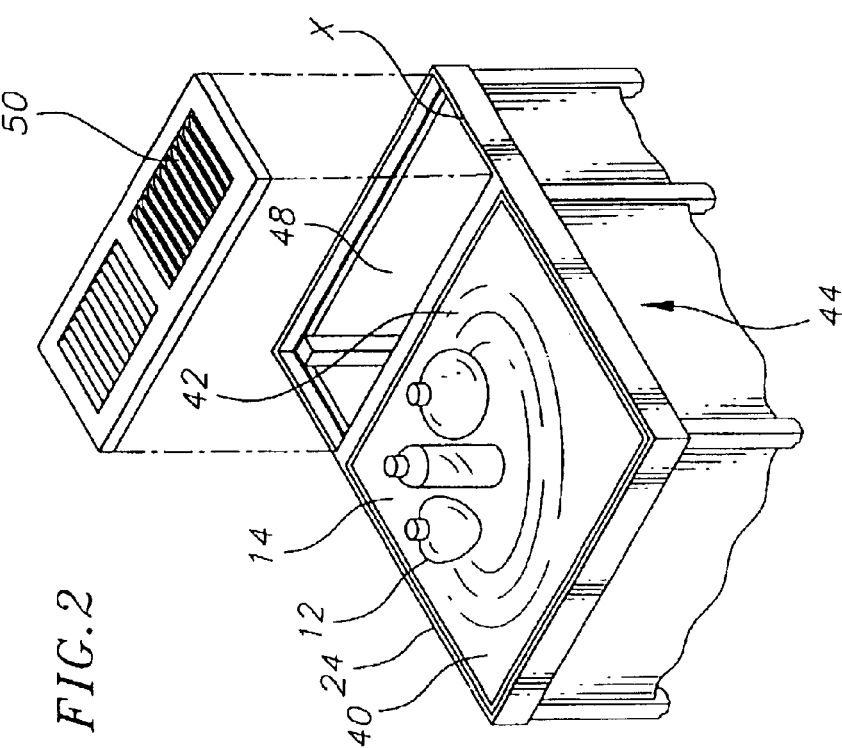
FIG. 2 is another perspective view of the display case of FIG. 1.

Referring to FIGS. 1 and 2, the present invention is directed to a display case 10 for use in displaying a wide variety of merchandise 12, for example, perfume (as shown), cosmetics, jewelry, or even shoes. The display case is configured to support the merchandise in a manner that presents the actual merchandise within a view V combining both the merchandise itself and an image emanating from a surface 14 on which the merchandise 12 is supported. As such, the view V is a combination of a three-dimensional object and a two-dimensional image, which may be static but preferably moving or dynamic. The display case 10 includes a frame 16 with vertical legs 18 and horizontal support bars 20, all of which may be constructed out of brushed stainless steel tubing. The frame may be approximately 3.5 feet tall, 29.0 inches long and 19.5 inches wide. Side panels 26 may be provided to protect the interior of the display case 10 and hide various components contained therein for an aesthetically-pleasing exterior. Such panels may be constructed out of a variety of materials, such as glass, plastic or wood.

In accordance with the present invention, a rear-projection panel 40 from which the image of the view V emanates is the very surface on which the merchandise 12 is supported. As understood by one of ordinary skill in the art, rear-projection panels or translucent screens may employ a variety of different technology and structure. Rear-projection panels typically have an image receiving surface and an image viewing surface that typically oppose or are coplanar with each other. Often, when image light is emitted from an image projector, the light beams are divergent when they impinge on the image receiving surface of the panel. The beams are then refracted or otherwise focused by the panel into a discernible image on the image viewing surface. Such panels may be constructed out of acrylic resin, polycarbonate resin, or the like, which has a high light transmission and the appropriate rigidity.

A rear-projection panel available from Econoco Corporation (Hicksville, N.Y.) under the name VisionScreen, is particularly suitable for use with the display case 10. While this type of panel tends to have greater luminance and clarity, other rear-projection panels may be used. Such other panels should preferably meet the conditions described herein terms of configuration, dimensions and structural strength.

The rear-projection panel 40 of the display case 10 is situated in the upper portion of the frame and secured thereto, such that it can provide the support surface 14 for the merchandised 12 while having its image viewing surface be visible to a viewer. The frame 16 may include a drawer 22 within which the panel 40 can sit. The drawer 22 may be configured to provide a border 24 above and around the panel 40 to "frame" the view V (best shown in FIG. 2) and can be releasably secured to the frame 16 by a lock.

The panel 40 is positioned in the drawer 22 such that its image viewing surface 42 faces outwardly and upwardly from the frame 16 and its receiving surface 44 faces inwardly and downwardly into the interior of the frame. In the illustrated embodiment, the panel 40 is supported evenly within the frame 16 in a substantially horizontal position without a substantial angle of inclination. The panel 40 is relatively level and flat so as to support the merchandise 12 in a relatively stable manner. Moreover, the panel 40 is of a thickness and/or structure that can withstand the weight of the merchandise 12 and any other display props or stands used with the merchandise. Where the display case is used for merchandise substantially heavier than cosmetics, perfume, jewelry or shoes, the panel 40, as understood by one of ordinary skill in the art, would be of a thickness and/or structure to withstand the additional weight. The panel 40 of the illustrated embodiment is approximately 22.5 inches by 19.5 inches and 0.25 inch thick.

An image projector 30 is positioned and arranged in the interior of the frame 16 so that image projected therefrom can be received by the receiving surface 44 of the panel 40. The image projector 30 is adapted to provide an image, and specifically, the image projector 30 can project slides to provide static images, or it can be adapted to process video image signals, such as those fed by a video cassette player or a digital video disc player, with or without audio capabilities. As such, the terms "image" and "images" are used interchangeably herein where appropriate.

The image projector 30 is housed within the confines of the frame 16 and the display case 10 can include a mirror 32 to increase the projection distance between the image projector 30 and the panel 40 as desired or appropriate. Thus, where the mirror 32 is used, it is a virtual image of the projected image from the image projector 30 that is received by the panel 40.

The image projector 30 and the mirror 32 are each supported by a plurality of plates 28 that are mounted onto the frame 16. As illustrated in FIG. 1, the plates 28 are mounted at angles that enable the image from the image projector 30 to be reflected off the mirror 32 and onto the receiving surface 42 of the panel 40. Depending on the dimensions of the image projector 30 and its projection distance properties, the frame 16 may be configured in terms of its height, length and/or width to accommodate appropriate positioning of the image projector 30 and the mirror 32 relative to each other and the panel 40. To retain the image projector 30 and/or mirror 32 at such angles on the plates 28, flanges 33 may be configured on the plates 28. Moreover, the plates 28 may be mounted by means that permit the projection angle of the image projector 30 and/or the reflection angle of the mirror 32 to be adjusted. For example, adjustable pivots 34 may be used to secure the plates 28 to the frame 16.

As best shown in FIG. 2, the length of the frame 16 of the illustrated embodiment of the display case 10 exceeds the length of the panel 40 along dimension x such that an access opening 48 is provided alongside the panel 40. Through the opening 48, which may be covered by a louvered vent member 50, maintenance, adjustment or replacement of the projector 30 may be accomplished.

In accordance with the present invention, the display case 10 displays the merchandise 12 in a manner such that it is seen superimposed on the image from the image projector 30, which image may be either static or moving. The view V provided by the display case 10 is therefore a combination of the actual (or real) image of the merchandise 12, namely, the merchandise itself, and a projected (or transmitted) image. In other words, because the merchandise 12 is placed on or supported by the panel 40 which is also transmitting an image, the resulting image or view V is a combination of real, three-dimensional object and a projected two-dimensional image.

In most instances, it is desirable that the image visible on the panel 40 complement the merchandise 12 displayed. The image may relate thematically to the merchandise or nature or characteristics thereof, and vice versa. The image and merchandise can also enhance each other by the selected placement of the merchandise 12 relative to the image. That is, the visible image can ideally be perceived as "interacting" or "blending" with the merchandise 12. For example, where the merchandise 12 is perfume or cologne, the image may be a dynamic or moving image of water ripples radiating outwardly from a common center. With selected placement of the merchandise 12 on the panel 40 to coincide with the common center of the moving image, the resulting combined view V is an unusual, if not intriguing, visual experience of water (or "perfume" as it may be intimated) rippling away "from" the perfume bottles. Moving or dynamic images (as opposed to a static image) may best capture the attention of customers. Moving images, typically prerecorded segments suitable for such purpose, may also be images of sand blowing, fire burning, ocean waves or even lava flowing. Such images depending on the intensity can also serve as a source of illumination illuminating the merchandise 12.

In the illustrated embodiment of FIG. 1, the display case also includes a glass enclosure 52 which may be releasably secured to the frame 16. The glass enclosure 52 includes four panels 52a–52d whose edges are joined by adhesives to provide a relatively rigid structure. The enclosure 52 is configured to fit over the panel 40 and the merchandise 12. A fifth panel 52e is affixed to the drawer 22 such that the panel 52e is displaced from the glass enclosure 52 when the drawer is open.

In operation, the display case of FIGS. 1 and 2 displays for example, perfume bottles atop the panel 40 which transmits moving images of rippling water. The image projector 30 in this example is transmitting prerecorded video images and also transmitting prerecorded audio effects of water dripping. Both the visual and sound effects of the display case catch the attention of a customer who then approaches the display case for a closer look. The customer then enjoys an aesthetically pleasing and intriguing visual (if not also audio) perception of a collection of perfume bottles "sitting atop rippling water circles," as created from the view V which combines actual perfume bottles and a two-dimensional image. The bottles themselves remain visible to the customer, but the customer's attention on the bottles is held and maintained by the view V over what otherwise might have been a mere fleeting glance at the bottles only.

Figure 3:
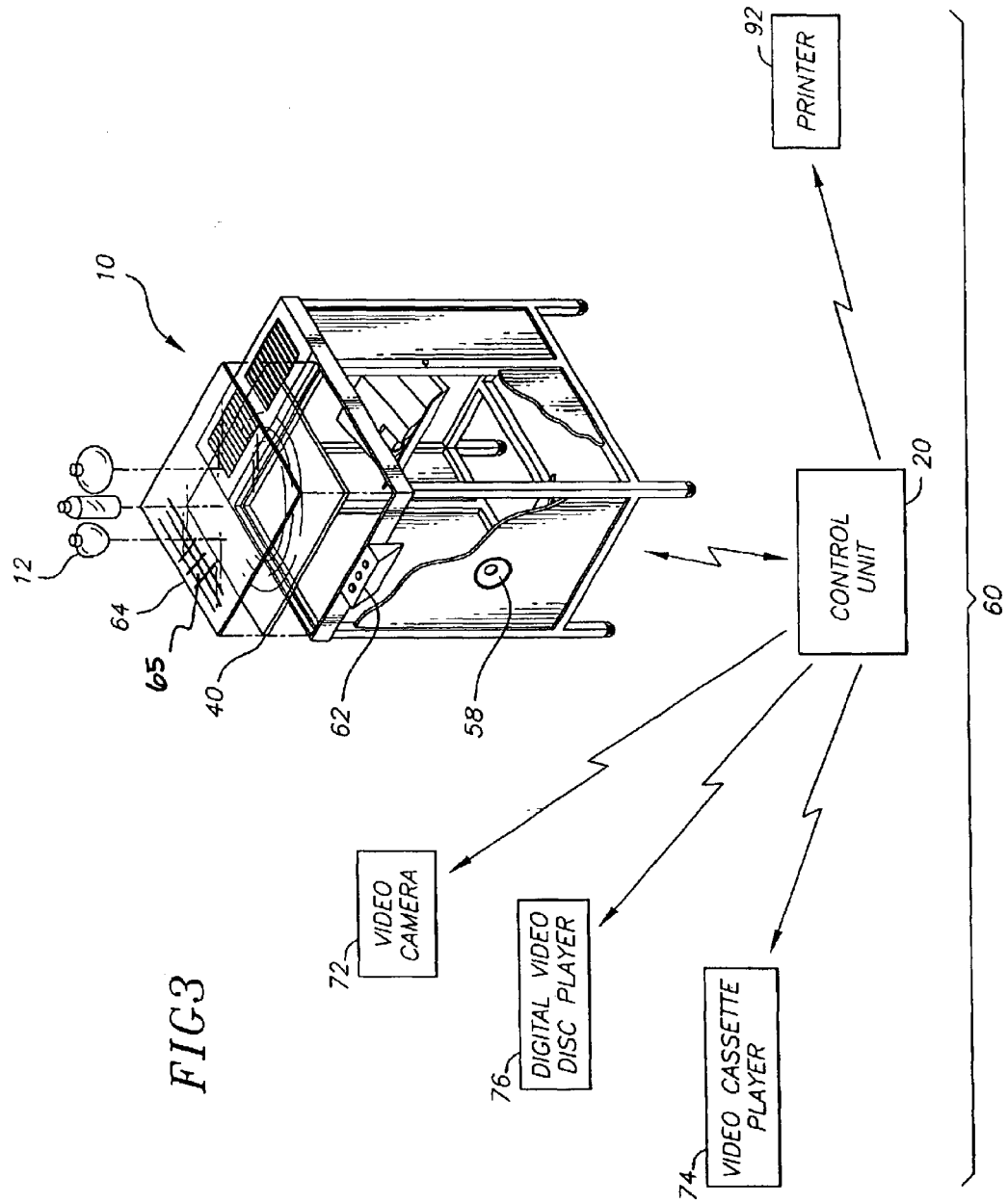
FIG. 3 is a perspective plan view of an embodiment of a display case system of the present invention.

Referring to FIG. 3, a display system 60 with interactive capabilities is shown, using a display case 10 of the foregoing description. An audio speaker 58 is mounted to the frame 16 and electrically connected and configured within the system to transmit to any audio effects or announcements. To render the system 60 interactive, user input devices, such as a keypad 62 and/or a touch screen 64 (shown along with the panel 40 in an exploded view), may be provided for communication between a user and a control unit 20 of the system 60. Whereas the keypad 62 may be mounted on the frame 16, the touch screen 64 may be positioned on the transmitting surface 44 of the panel 40 (or a portion thereof). To that end, the glass enclosure 52 may be removed partially or entirely so that the touch screen may be accessed and used in coordination with the images visible on the panel 40.

The touch screen 64 is transparent so that the image on the panel 40 is visible through it. As understood by one of ordinary skill in the art, the touch screen may be, for example, a glass panel which is configured and shaped to correspond to the configuration of the panel 40. One type of available touch screen is fitted with a number of relatively short spaced-apart linear electrodes extending along the perimeter of the touch screen 64. In that regard, the frame 16 may be configured to allow electrical connections for the touch screen 64 to be routed into the interior of the frame 16.

Using the keypad 62, and/or the touch screen 64 which is equipped with any desired number of touchfields 65 (or soft switches), a customer can "communicate" with the control unit 20 for enabling the system 60 to perform a variety of functions, including the control of the image projector 30 in selecting the image shown on the panel 40.

Alternatively or in addition to the keypad 62 or touch-screen 64, heat-sensitive touch pads 66 may be mounted on or affixed to the glass enclosure 52, particularly, the panel 52e, as another user input device for communication with the control unit 20.

The system 60 may include a plurality of image sources 70, for example, video cassette player (VCP) 74, digital video disc player (DVD player) 76, or even a video camera 72, any one of which may be selected by the customer as the source of the image visible on the panel 40. Depending on the selection made via the user input devices, the system 60 can interactively and selectively change the image displayed on the panel 40. In that regard, the control unit 20 responsive to user input signals is adapted to activate the appropriate image source to send image signals to the image projector 30. In general, the customer at the prompting of suitable text, graphics and/or images visible on the panel 40, as controlled by the control unit 20, responds to or otherwise communicates with the system 10 by selecting and touching the field 65, keys on the keypad 64 and/or the heat-sensitive touch pads 66.

The image sources 70 of the system 10, in addition to providing static or moving images, can provide prerecorded images (as transmitted by the slide projector VCP 74 or the DVD player 76), or live images (transmitted by the video camera 72). Such prerecorded images can include the aforementioned "scenic" moving images, or a prerecorded infomercial segment relating to the merchandise displayed. Live images may include those of a demonstration or fashion show occurring at a location remote from the display system and captured by the video camera 72.

In accordance with the present invention, at least certain of user input devices are configured to enable the user to select the source of the image signals provided to the image projector 30. The provision of prerecorded video images and live video images enables the system to flexibly accommodate the desires and needs of the customer.

Furthermore, the user can use the user input devices to activate and control other electrical components of the system 10, such as a printer 92. The printer 92 may be electrically configured to print brochures or other promotional materials relating to the merchandise displayed.

In operation, the display system 60 may operate between a default mode and an interactive mode. The default mode may involve the control unit 20 controlling the display case 10 to operate in a manner similar to the description provided above. For example, the control unit 20 may control the display case 10 to continuously or repeatedly show merely a prerecorded scenic image from the DVD player, such as the water rippling images previously mentioned. However, the default mode of operation may be switched to an interactive mode of operation upon the presence of a customer, as detected by a sensor 105 which may be a motion detector or an infrared sensor.

Upon receiving a signal from the sensor 105, the control unit 20 switches to the interactive mode of operation and begins by prompting the customer with a set of instructions or selections, as conveyed to the customer visually on the panel 40 and/or by audio through the speaker 58. This prompt may include a "welcome" message followed by a series of inquiries, as conveyed to the user by means of a series of displays of suitable instructional text and/or graphics on the panel 40 along with a series of prerecorded audio announcements. If no response is received by the system 60 and the sensor 105 no longer detects the presence of the customer, the system 60 may then switch from the interactive mode of operation back to the default or inactive mode of operation, until it receives another signal from the sensor 105 indicating the presence of another customer. In that regard, the sensor 105 may also be used with the aforementioned display case 10 to enable it to operate efficiently by being activated only when the sensor 105 signals the presence of a customer.

Figure 4:
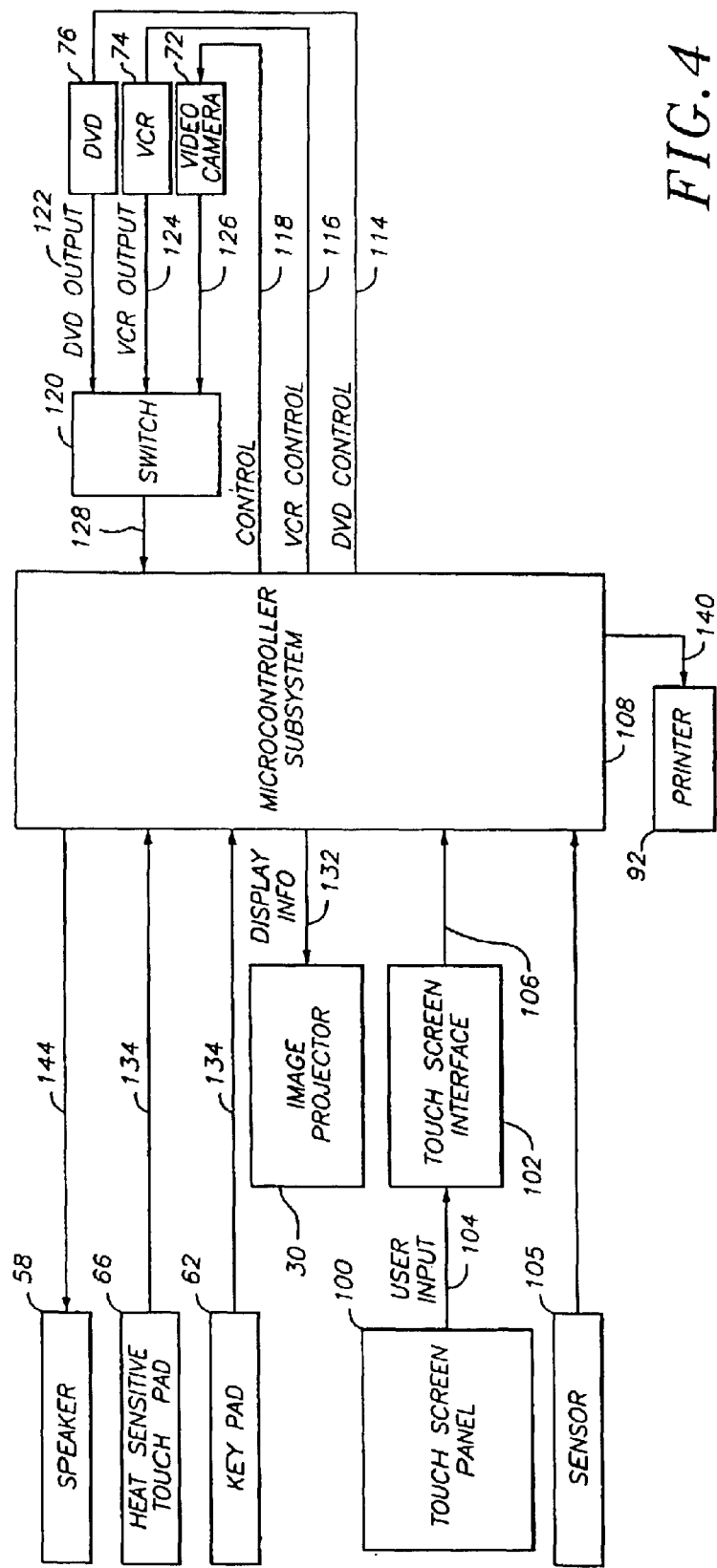
FIG. 4 is a block electrical circuit diagram showing the electrical circuit employed for an embodiment of the system of FIG. 3.

Referring to FIG. 4, a block electrical circuit diagram of the system 60 is shown. The control unit 20, also referred to as a microcontroller subsystem (hereinafter "MCSS") 108 communicates with the plurality of image sources 70, such as the DVD player 76 via connection 114, the VCP 74 via connection 116 and the video camera 72 via connection 118. The MCSS 108 is adapted to activate and control any selected of the image sources 70 and to receive the output video image signals therefrom. To that end, the system 10 provides a switch 120 for receiving output video image signals from the DVD player 76 via connection 122, from the VCP 74 via connection 124 and from the video camera 72 via connection 126. The switch 120 relays these output image signals to the MCSS 108 via connection 128. Receiving these output image signals, the MCSS 108 sends signals to the image projector 30 via connection 132.

Any audio signals from the DVD 76, VCP 74 or the video camera 72 are also sent along connections 122, 124, 126 and 128. The audio signals from the DVD player 76, VCP 74 or video camera 72 are also processed by the MCSS 108 and sent to the speaker 58 along connection 144.

Operating in the default or inactive mode, the MCSS 108 controls, for example, the VCP 74, to continuously provide prerecorded video signals of images of rippling water circles to the image projector 30, where such images are seen in combination with the merchandise 12 to provide a unique and intriguing view V of a real object superimposed on a two-dimensional image. The system 10 operates in this mode until the sensor 105 detects the presence of a customer.

Upon receiving a signal from the sensor 105 indicating the presence of a customer via connection 103, the MCSS 108 can supply signals, including computer graphic signals, to the image projector 30 to display instructional information which may be text or graphics to request a response from the customer via the user input devices. In that regard, as mentioned above, the customer can communicate with the system 10 via the keypad 62, the touch screen 64 and/or the heat-sensitive touch pads 66.

The keypad 62 communicates with the MCSS 108 via connection 134 and the heat-sensitive touch pads 66 communicate with the MCSS 108 via connection 135. The touch screen 64 and panel 40 are shown in combination as a touch screen panel 100 whose text, images or graphics for purposes of communicating with and prompting a customer for response and selection are controlled by the MCSS 108. The touch screen panel 100 is coupled to the MCSS 108 via a touch screen interface 102 which receives user input signals via connection 104 and relays the user input signals to the control unit 20 via connection 106.

As understood by one of ordinary skill in the art, the MCSS 108 is configured and adapted to control the image or graphics visible on the panel 40 for use with at least the touch screen 64, if not also the other user input devices. Specifically with regard to the touch screen 64, the MCSS 108 is programmed so that when the user touches a given field 65 of the touch screen 64, the system 10 responds accordingly. To use the present system, the customer touches the fields 65 which correspond to the image source he wishes to select. The touch screen senses each touch and generates the corresponding user input signal which identifies the field.

The MCSS 108 is further adapted to be responsive to the key pad 62 and/or pads 66 for indicating the customer's response and selection, including the activation of printer 92 via connection 140. In this regard, the MCSS 108 is configured to output to the printer 92 image signals from any of the video image sources 70 or any image signals stored in the MCSS 108, such as promotional or purchase information and materials.

FIG. 5 is a flow diagram illustrating the steps performed by the system 60 and/or the MCSS 108 in one embodiment of the present invention. In Block 300, the display system 60 is activated thereby activating the display case 10, the MCSS 108, the image sources 70 and any other electrical components such as the printer 92. In Block 302, the MCSS 108 enables the default mode of operation as described above, which may include the activating and controlling of, for example, the VCP 72 to continuously or repeatedly transmit images of water rippling to the image projector 30 in the display case 10.

In Block 304, the sensor 105 is read to determine whether a customer is present. If no customer is detected in Block 306, the MCSS 108 returns to Block 304 to again determine whether a customer is present. This loop continues until Block 306 indicates yes at which occurrence the MCSS 108 continues to Block 308 to enable the interactive mode. As described above, the interactive mode involves the MCSS 108 presenting and displaying a "welcome" message visually on the image projector 30 (as seen on the panel 30 of the display case 10) and/or an audio announcement over the speaker 58. After receiving the welcome message and announcement, the customer may be prompted to indicate his/her personal data, such as gender, age and the like.

In Block 310, the MCSS 108 determines whether there is any customer input via the user input devices, including the keypad 62, the touchscreen panel 100 and/or the heat sensitive touchpads 66. If no input is received, the MCSS 108 in Block 312 again reads the sensor 105 and in Block 314 determines whether the customer is still present. If no, the MCSS 108 returns to Block 302 to enable the default mode. If yes, the MCSS 108 returns to Block 310 to again determine whether there is customer input. If there is customer input, such as an indication of the customer's gender and age, the MCSS 108 proceeds onto Block 316 to execute on the input. The MCSS 108 then returns to Block 308 whereupon the MCSS 108 prompts the customer, for example, to indicate whether he or she would like to see a video transmission of a live demonstration on the panel 30 (via a signal feed from the video camera 72) or a prerecorded infomercial on the panel 30 (via a signal feed from the DVD player 76).

Again in Block 310, the MCSS 108 determines whether the customer has responded and then either in Block 316 acts on the input, or in Blocks 312 and 314 determines whether the customer is still present.

Upon return to the Block 308, the MCSS 108 may then prompt the customer whether he/she desires to activate the printer 92 to print a brochure or other promotional materials. The return to Block 308 after determining the continued presence of the customer by the MCSS 108 may continue as appropriate in order to accomplish the level or amount of interactivity between the customer and the system 60 as desired.

It is understood by one of ordinary skill in the art that the various components described hereinabove may assume different configurations all accomplishing the same desirable result. It is also understood by one of ordinary skill in the art that the configurations and dimensions of various components may be altered and modified as desirable. In that regard, various alternative techniques and configures may be employed departing from those disclosed and suggested herein.

Consequently, it is to be understood that the scope hereof should be determined in accordance with the claims as set forth below.

What is claimed is:

1. A display case for displaying merchandise, comprising:
    a rear-projection panel having a receiving surface and an image viewing surface, the panel supporting the merchandise on the image viewing surface; and
    a projector adapted to project an image onto the receiving surface of the panel;
    whereby the display case presents a view combining the merchandise and the image visible on the image viewing surface of the panel.

2. A display case of claim 1, further comprising a mirror oriented to reflect the image from the projector onto the receiving surface of the panel.

3. A display case of claim 1, wherein the image is dynamic.

4. A display case of claim 1, further comprising a frame configured to define an interior housing said projector.

5. A display case of claim 1, wherein the frame is configured with a drawer, said panel situated in said drawer.

6. A display case of claim 1, wherein the image visible on the image viewing surface of the rear-projection panel illuminates the merchandise.

7. A display case of claim 1, wherein the merchandise includes jewelry.

8. A display case of claim 1, wherein the merchandise includes perfume.

9. A display case of claim 1, wherein the merchandise includes a shoe.

10. A display case of claim 1, wherein the merchandise includes cosmetics.

11. A display case of claim 1, further comprising an image source providing image signals to the projector.

12. A display case of claim 11, wherein the image source provides pre-recorded images.

13. A display case of claim 11, wherein the image source provides live images.

14. A display case of claim 11, wherein the image source provides static images.

15. A display case of claim 11, wherein the image source provides dynamic images.

16. A display case of claim 1, wherein the merchandise includes bottled perfume and the image includes ripples.

17. A display case of claim 1, wherein the image is provided by a video cassette player.

18. A display case of claim 1, wherein the image is provided by a DVD player.

19. A display case of claim 1, wherein the image is provided by a video camera.

20. A display case of claim 1, further comprising an audio speaker.

* * * * *